US012663897B2

(12) United States Patent
Kim et al.

(10) Patent No.: US 12,663,897 B2
(45) Date of Patent: Jun. 23, 2026

(54) TOUCH CIRCUIT AND TOUCH SENSING DISPLAY DEVICE INCLUDING THE SAME

(71) Applicant: LG Display Co., Ltd., Seoul (KR)

(72) Inventors: Min Chul Kim, Paju-si (KR); Hyun Woo Jang, Paju-si (KR)

(73) Assignee: LG DISPLAY CO., LTD., Seoul (KR)

( * ) Notice: Subject to any disclaimer, the term of this patent is extended or adjusted under 35 U.S.C. 154(b) by 0 days.

(21) Appl. No.: 18/883,668

(22) Filed: Sep. 12, 2024

(65) Prior Publication Data

US 2025/0208733 A1 Jun. 26, 2025

(30) Foreign Application Priority Data

Dec. 22, 2023 (KR) ......................... 10-2023-0189987

(51) Int. Cl.
G06F 3/041 (2006.01)

(52) U.S. Cl.
CPC .......... G06F 3/0418 (2013.01); G06F 3/0412 (2013.01)

(58) Field of Classification Search
CPC ...................................................... G06F 3/041
USPC .................................................. 345/173–174
See application file for complete search history.

(56) References Cited

U.S. PATENT DOCUMENTS

| | | | |
|---|---|---|---|
| 9,268,432 B2 * | 2/2016 | Guo | ....................... G06F 3/0416 |
| 10,488,996 B2 * | 11/2019 | Rosenberg | .............. G01S 17/88 |
| 2012/0056822 A1 * | 3/2012 | Wilson | .................. G06F 3/0418 |
| | | | 345/173 |
| 2018/0107338 A1 * | 4/2018 | Chung | ................ G06F 3/04184 |
| 2020/0097112 A1 * | 3/2020 | Seo | .......................... G06F 3/044 |

FOREIGN PATENT DOCUMENTS

KR 10-2022-0096882 A 7/2022

* cited by examiner

*Primary Examiner* — Kwin Xie

(74) *Attorney, Agent, or Firm* — Birch, Stewart, Kolasch & Birch, LLP

(57) ABSTRACT

A touch circuit includes a micro control circuit and a readout integrated circuit configured to communicate with the micro control circuit though a selection signal line, a clock signal line, a master output slave input (MOSI) signal line, and a master input slate output (MISO) signal line. In a first period, the readout integrated circuit generates a first interrupt request signal representing completion of touch sensing, and transfers the first interrupt request signal to the micro control circuit through the MISO signal line. In a second period which differs from the first period, the readout integrated circuit generates a second interrupt request signal, representing a kind of error and whether an operation state thereof is normal, and transfers the second interrupt request signal to the micro control circuit through the MOSI signal line.

14 Claims, 13 Drawing Sheets

< Normal Read >

< IRQ Mode >

< Non-Error State >

< Error State 1 >

< Error State 2 >

TOUCH CIRCUIT AND TOUCH SENSING DISPLAY DEVICE INCLUDING THE SAME

CROSS-REFERENCE TO RELATED APPLICATIONS

This application claims priority to Korean Patent Application No. 10-2023-0189987 filed in the Republic of Korea on Dec. 22, 2023, the entire contents of which is hereby expressly incorporated by reference into the present application.

BACKGROUND

Field of the Invention

The present disclosure relates to a touch circuit and a touch sensing display device including the same.

Discussion of the Related Art

Touch sensing display device can recognize a touch input of a user applied to a display panel and can perform various application functions based on the touch input.

Touch sensing display device can include a plurality of touch electrodes which are disposed in a display panel, for touch recognition. Touch sensing display device can supply a touch driving signal to the touch electrodes and can detect the capacitance variations of the touch electrodes to calculate touch coordinates and whether there is a touch input.

When noise flows in from the outside, the touch sensing display device can abnormally operate, and due to this limitation, the accuracy of touch sensing can be reduced. As such, it is desirable to develop a method which recovers and improves the touch sensing performance of a touch sensing display device when an abnormal operation state occurs.

SUMMARY OF THE DISCLOSURE

To overcome the aforementioned limitations and other issues of the related art, the present disclosure can provide a touch circuit and a touch sensing display device including the same, which can transfer readout integrated circuit (ROIC) operation state information from an ROIC to a micro control unit (MCU) without a change in operation mode in the middle of touch sensing and can quickly recover an abnormal operation state to a normal state when an abnormal operation occurs.

To achieve these objects and other advantages and in accordance with the purpose of the disclosure, as embodied and broadly described herein, a touch circuit includes a micro control circuit and a readout integrated circuit configured to communicate with the micro control circuit though a selection signal line, a clock signal line, a master output slave input (MOSI) signal line, and a master input slate output (MISO) signal line, wherein the readout integrated circuit generates a first interrupt request signal representing completion of touch sensing and transfers the first interrupt request signal to the micro control circuit through the MISO signal line in a first period, and in a second period which differs from the first period, the readout integrated circuit generates a second interrupt request signal, representing the kind of error and whether an operation state thereof is normal, and transfers the second interrupt request signal to the micro control circuit through the MOSI signal line.

In another aspect of the present disclosure, a touch sensing display device includes a display panel and the touch circuit for sensing a touch input applied to the display panel.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. In the drawings:

FIG. 3 is a diagram illustrating a hardware configuration of a touch circuit according to one or more embodiments of the present disclosure;

DETAILED DESCRIPTION OF THE EMBODIMENTS

Figure 1:
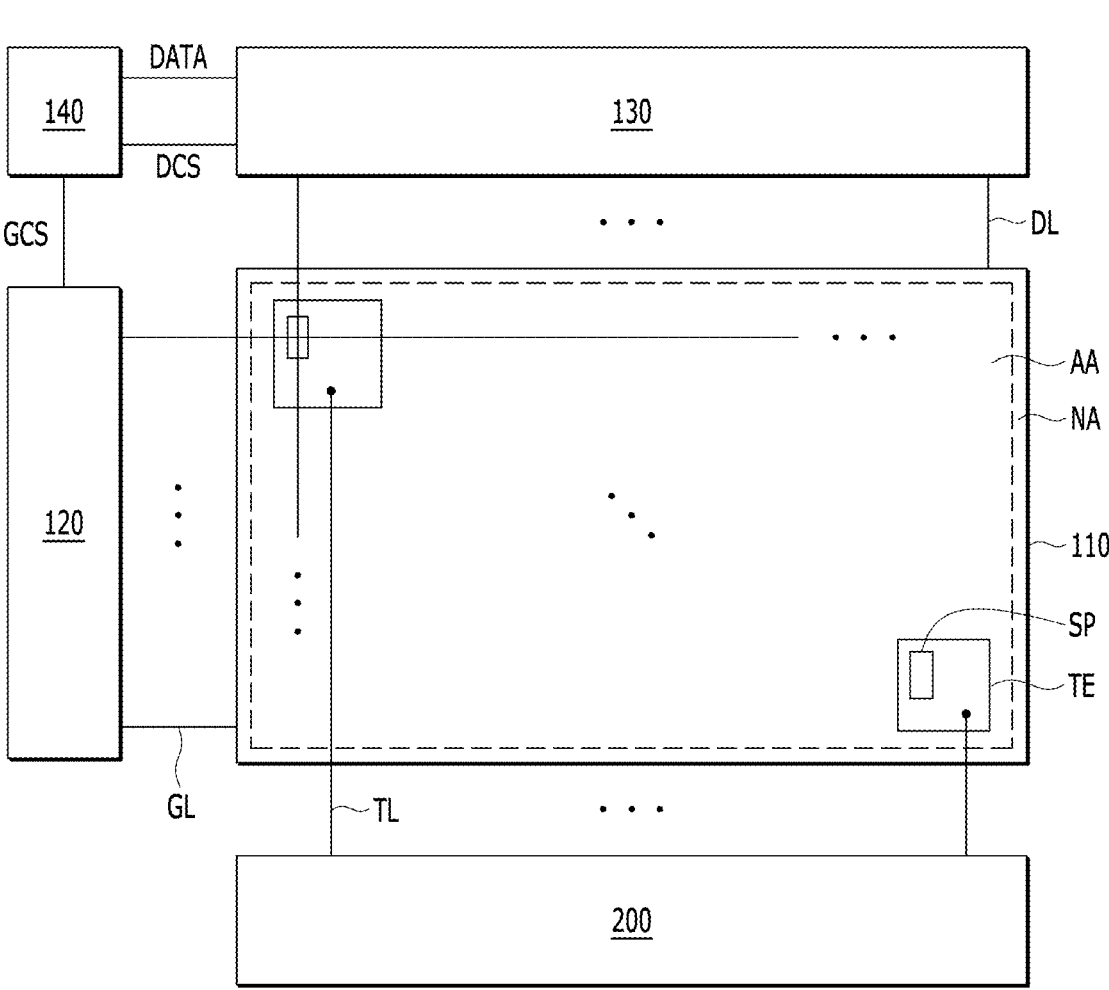
FIG. 1 is a diagram schematically illustrating a touch sensing display device according to one or more embodiments of the present disclosure.

Hereinafter, the present disclosure will be described more fully with reference to the accompanying drawings, in which example embodiments of the disclosure are shown. The disclosure may, however, be embodied in many different forms and should not be construed as being limited to the embodiments set forth herein; rather, these embodiments are provided so that this disclosure will be thorough and complete, and will fully convey the concept of the disclosure to those skilled in the art.

Advantages and features of the present disclosure, and implementation methods thereof will be clarified through following embodiments described with reference to the accompanying drawings. The present disclosure may, however, be embodied in different forms and should not be construed as limited to the embodiments set forth herein. Rather, these embodiments are provided so that this disclosure will be thorough and complete, and will fully convey the scope of the present disclosure to those skilled in the art. Furthermore, the present disclosure is only defined by scopes of claims.

The shapes, sizes, ratios, angles, numbers and the like disclosed in the drawings for description of various embodiments of the present disclosure to describe embodiments of the present disclosure are merely examples and the present disclosure is not limited thereto. Like reference numerals refer to like elements throughout. Throughout this disclosure, the same elements are denoted by the same reference numerals. As used herein, the terms "comprise", "having," "including" and the like suggest that other parts can be added unless the term "only" is used. As used herein, the singular forms "a", "an", and "the" are intended to include the plural forms as well, unless context clearly indicates otherwise.

Elements in various embodiments of the present disclosure are to be interpreted as including margins of error even without explicit statements.

In describing a position relationship, for example, when a position relation between two parts is described as "on", "above", "over", "under", and "next", one or more other parts can be disposed between the two parts unless "just" or "direct" is used.

It will be understood that, although the terms "first", "second", etc. can be used herein to describe various elements, these elements should not be limited by these terms. These terms are only used to distinguish one element from another and may not define order or sequence. For example, a first element could be termed a second element, and, similarly, a second element could be termed a first element, without departing from the scope of the present disclosure. Further, the term "can" encompasses all the meanings and coverages of the term "may."

In the following description, when the detailed description of the relevant known function or configuration is determined to unnecessarily obscure the important point of the present disclosure, the detailed description will be omitted. Hereinafter, embodiments of the present disclosure will be described in detail with reference to the accompanying drawings. All the components of each display device or device according to all embodiments of the present disclosure are operatively coupled and configured.

FIG. 1 is a diagram schematically illustrating a touch sensing display device 100 according to one or more embodiments of the present disclosure.

Referring to FIG. 1, a touch sensing display device 100 according to the present embodiments can provide a display function of reproducing an input image in a screen thereof and a touch sensing function of sensing a touch input of a user.

The touch sensing display device 100 can include a display panel 110 where a plurality of data lines DL and a plurality of gate lines GL are provided and a display driving circuit and a timing controller 140 for driving the display panel 110. The plurality of data lines DL and the plurality of gate lines GL may intersect one another. Each of the plurality of data lines DL may be configured to extend in a first direction. Each of the plurality of gate lines GL may be configured to extend in a second direction different from the first direction.

In terms of functions, the display driving circuit can be divided into a gate driving circuit 120 for driving the gate lines GL and a data driving circuit 130 for driving the data lines DL. The display driving circuit can be implemented as one or more integrated circuits (ICs).

The display panel 110 can include an active region (active area) AA where a plurality of subpixels SP are provided and a non-active region (non-active area) NA which is disposed outside the active region AA. The non-active region NA can surround the active region AA entirely or in part. Each of a plurality of touch electrodes TE can be disposed in a region corresponding to two or more subpixels SP. All or a portion of the non-active region NA may be an area visible from the front surface of the active region AA, or an area that is bent and invisible from the front surface of the active region AA or an area that is covered by a case or housing (not shown) of the active region AA.

The plurality of data lines DL and the plurality of gate lines GL can be disposed in the display panel 110, and subpixels SP can be provided in areas defined by intersections between the data lines DL and the gate lines GL. A plurality of touch lines TL electrically connected to the plurality of touch electrodes TE can be further disposed in the display panel 110.

First, elements for display driving in the touch sensing display device 100 will be described below.

The gate driving circuit 120 can be controlled by the timing controller 140 and can sequentially output a scan signal (which may be referred to as gate signal) to the plurality of gate lines GL disposed in the display panel 110 to control a driving timing of each of the plurality of subpixels SP.

The gate driving circuit 120 can include one or more gate driver integrated circuits (GDICs), and the GDICs can be disposed at only one side of the display panel 110 or both sides of the display panel 110, based on a driving type.

Each of the GDICs can be connected to a conductive pad such as a bonding pad of the display panel 110 in a tape automated bonding (TAB) type or a chip on glass (COG) type or the chip-on-panel (COP) type, without being limited thereto. Alternatively, each GDIC can be implemented as a gate in panel (GIP) type and can be directly disposed in the display panel 110. Alternatively, each GDIC can be integrated and disposed in the display panel 110. Alternatively, each GDIC can be implemented as a chip on film (COF) type mounted on a film connected to the display panel 110. In one or more aspects, the GDICs may be disposed in the non-display area NA of the display panel 110 by a gate-in-panel (GIP) technique, without being limited thereto. Alternatively, the GDICs may be disposed in the display area AA of the display panel 110.

The data driving circuit 130 can receive image data from the timing controller 140 and can convert the image data into analog data voltages. The data driving circuit 130 can output the data voltages to the data lines DL in synchronization with a timing at which the scan signal is applied through the gate lines GL to allow the subpixels SP to implement brightness based on the image data.

The data driving circuit 130 can include one or more source driver integrated circuits (SDICs). Each of the SDICs can include a shift register, a latch circuit, a digital-to-analog converter (DAC), and an output buffer, without being limited thereto.

Each SDIC can be connected to a conductive pad such as a bonding pad of the display panel 110 in the TAB type or the COG type. Alternatively, each SDIC can be directly disposed in the display panel 110. Alternatively, each SDIC can be integrated and disposed in the display panel 110. Alternatively, each SDIC can be implemented as the COF type. In this case, each SDIC can be mounted on a film connected to the display panel 110 and can be electrically connected to the display panel 110 through lines of the film. In one or more aspects, the SDICs may be disposed in the non-display area NA of the display panel 110, without being limited thereto. Alternatively, the SDICs may be disposed in the display area AA of the display panel 110.

The timing controller 140 can supply various control signals to the gate driving circuit 120 and the data driving circuit 130 and can control operating timings of the gate driving circuit 120 and the data driving circuit 130.

Specifically, the timing controller 140 can supply a data driving control signal to the data driving circuit 130 to control the data driving circuit 130, and supply a gate driving control signal to the gate driving circuit 120 to control the gate driving circuit 120.

The timing controller 140 can be mounted on a printed circuit board (PCB) or a flexible PCB and can be electrically connected to the gate driving circuit 120 and the data driving circuit 130 through the PCB or the FPCB, without being limited thereto.

The timing controller 140 can allow the gate driving circuit 120 to output the scan signal, based on a timing set in each frame, and can allow the data driving circuit 130 to convert image data into data voltages in synchronization with the scan signal.

The timing controller 140 can receive, from the outside (for example, a host system), various timing signals including a vertical synchronization signal VSYNC, a horizontal synchronization signal HSYNC, an input data enable signal DE, and a clock signal CLK along with the image data, without being limited thereto.

The timing controller 140 can generate a gate control signal GCS and a data control signal DCS, can output the gate control signal GCS to the gate driving circuit 120 to control the gate driving circuit 120, and can output the data control signal DCS to the data driving circuit 130 to control the data driving circuit 130.

The gate control signal GCS can include a gate start pulse GSP, a gate shift clock GSC, and a gate output enable signal GOE, without being limited thereto. The gate start pulse GSP can control an operation start timing of each of one or more GDICs. The gate shift clock GSC can be a clock signal which is input to one or more GDICs in common and can control a shift timing of the scan signal. The gate output enable signal GOE can control an output timing of each of one or more GDICs.

The data control signal DCS can include a source start pulse SSP, a source sampling clock SSC, and a source output enable signal SOE. The source start pulse SSP can control a data sampling start timing of each of one or more SDICs configuring the data driving circuit 130. The source sampling clock SSC can be a clock signal which controls a sampling timing of data in each SDIC. The source output enable signal SOE can control an output timing of the data driving circuit 130.

The touch sensing display device 100 can further include a power management IC which supplies various voltages or currents to the display panel 110, the gate driving circuit 120, and the data driving circuit 130, or controls various voltages or currents which are to be supplied.

In some aspects, the touch sensing display device 100 may be a mobile terminal such as a notebook computer, a smart phone, a tablet, or the like, or a monitor, a television (TV), or the like, without being limited thereto. Such devices may be configured in various types, sizes, and shapes. The touch sensing display device 100 according to aspects of the present disclosure are not limited thereto, and may include various types, sizes, and shapes of the display device configured to display information or images Hereinafter, elements for touch sensing driving in the touch sensing display device 100 will be described below.

The touch sensing display device 100 can include a touch screen panel where a plurality of touch electrodes TE are disposed for touch sensing and a touch circuit 200 which performs driving and sensing processing of the touch screen panel, without being limited thereto.

The touch screen panel can be an external type where the touch screen panel is manufactured independently from the display panel 110 and is bonded to the display panel 110, or can be an internal type where the touch screen panel is manufactured together in a manufacturing process of the display panel 110 and is provided in the display panel 110. In the touch sensing display device 100 according to the present embodiment, the touch screen panel can be an independent panel including the touch sensing function, or can denote the display panel 110 which has all of the touch sensing function and the display function. Specifically, in the case of the external type of the touch screen panel, the touch screen panel may be an independent panel including the touch sensing function, and in the case of the internal type of the touch screen panel, the touch screen panel may be a panel which has all of the touch sensing function and the display function. Hereinafter, the internal type where the touch screen panel is manufactured together in a manufacturing process of the display panel 110 and is provided in the display panel 110 will be described for example.

The touch circuit 200 can drive the plurality of touch electrodes TE disposed in the display panel 110. The touch circuit 200 can supply a touch driving signal to at least one of a plurality of touch electrodes TE, can receive a touch sensing signal from the touch electrodes TE, and can detect touch coordinates and whether there is a touch, based on the touch sensing signal. The touch circuit 200 can be implemented as one element or two or more elements (for example, ICs) and can be implemented independently from the display driving circuit. Further, all or a portion of the touch circuit 200 can be integrated and implemented in the display driving circuit or an internal circuit thereof. For example, a portion of the touch circuit 200 can be implemented as an IC along with the data driving circuit 130.

The touch electrode TE can be an electrode which is disposed to dividing a common electrode for display driving. In this case, the touch electrode TE can perform a function of an electrode for touch sensing and a function of an electrode for display sensing.

For example, the touch electrode TE can be driven as the common electrode in a temporally divided period. Alternatively, the touch electrode TE can simultaneously perform a function of the touch electrode TE and a function of the common electrode.

The touch circuit 200 can supply the touch driving signal to the touch electrode TE in a display driving period or a temporally divided period of the display driving period to perform touch sensing. For example, the touch circuit 200 can perform touch sensing by a self-capacitance sensing technique or a mutual-capacitance sensing technique, without being limited thereto.

In the example where the touch circuit 200 performs touch sensing by the self-capacitance sensing technique, the touch circuit 200 can perform touch sensing based on capacitance between each touch electrode TE and a touch object (e.g., a finger, a pen, and the like).

Figure 2:
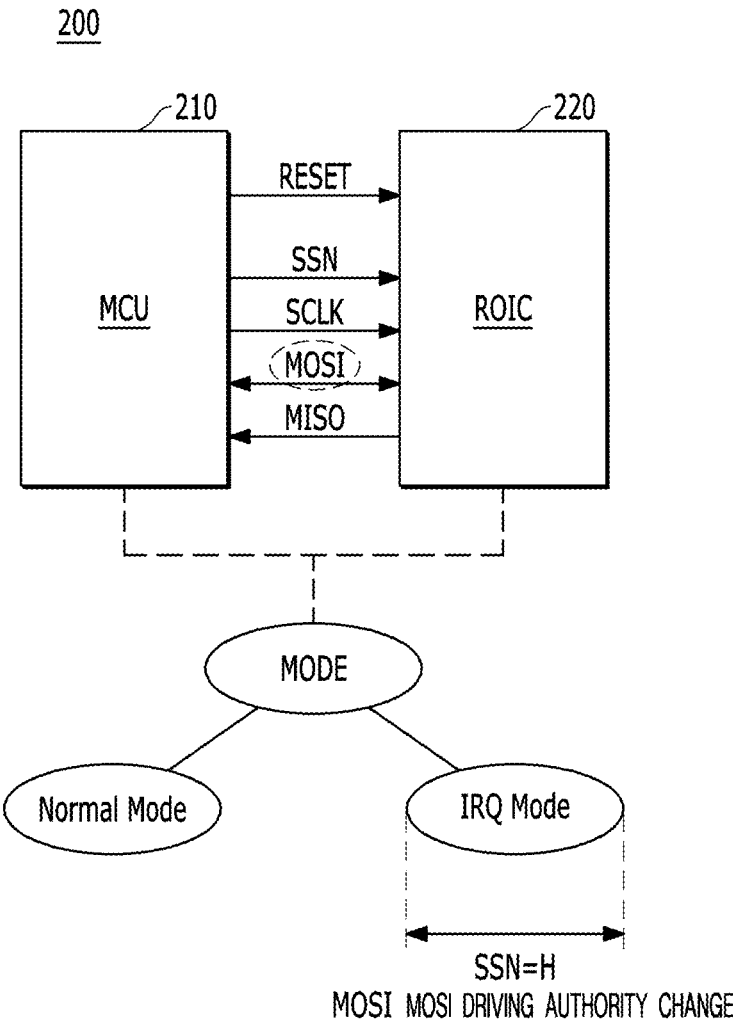
FIG. 2 is a diagram illustrating a touch circuit and an operation mode thereof according to one or more embodiments of the present disclosure.

FIG. 2 is a diagram illustrating a touch circuit 200 and an operation mode thereof according to one or more embodiments of the present disclosure.

Referring to FIG. 2, the touch circuit 200 according to the present embodiment can include a micro control unit (MCU) 210 and a readout IC (ROIC) 220 which are connected to each other, without being limited thereto. Embodiments are not limited thereto. As an example, at least one of the above-mentioned components may be omitted, and/or one or more additional components could be further included.

The MCU 210 and the ROIC 220 can be connected to each other and can transfer or receive a plurality of control signals and a plurality of touch information signals. For example, the MCU 210 and the ROIC 220 may be connected to each other through a serial peripheral interface (SPI), without being limited thereto. To this end, each of the MCU 210 and the ROIC 220 can include a plurality of connection pins which are connected to each other through a plurality of transfer lines based on an SPI communication scheme and transfer or receive data information, based on the SPI communication scheme.

For example, the plurality of transfer lines may comprise a selection signal (SSN) line, a clock signal (SCLK) line, a master output slave input (MOSI) signal line, and a master input slave output (MISO) signal line, without being limited thereto. Further, the plurality of transfer lines may further comprise a reset line. The MOSI signal line may be driven based on bidirectional interfacing.

For example, each of the MCU 210 and the ROIC 220 may further include a plurality of connection pins connected to the selection signal (SSN) line, the clock signal (SCLK) line, the master output slave input (MOSI) signal line, and the master input slave output (MISO) signal line and may further include a reset pin for controlling a reset of the ROIC 220, without being limited thereto.

An operation mode, based on the SPI communication scheme, of the touch circuit 200 according to the present embodiment can be divided into a normal mode and an interrupt request (IRQ) mode, without being limited thereto.

In the SPI communication scheme, the MCU 210 can be a master device, and the ROIC 220 can be a slave device, without being limited thereto.

A normal mode, in order to change an operation of the ROIC 220, an SPI write function can be performed on a specific register of the ROIC 220, or an SPI read function for reading a specific register value of the ROIC 220 can be performed.

In an IRQ mode, the ROIC 220 can generate a first interrupt request signal for notifying the completion of touch sensing to transfer to the MCU 210. For example, the ROIC 220 may generate the first interrupt request signal representing completion of touch sensing to transfer to the MCU 210 through the MISO signal line. The MCU 210 can receive the first interrupt request signal to start a touch data read operation. The MCU 210 can read touch data stored in a buffer of the ROIC 220 to transfer to an internal memory thereof.

Particularly, in the IRQ mode according to the present embodiment, the ROIC 220 can generate a second interrupt request signal by toggling a MOSI signal for notifying whether an operation state thereof is normal and can transfer the second interrupt request signal to the MCU 210. For example, the ROIC 220 may generate the second interrupt request signal, representing a kind of error and whether an operation state thereof is normal and transfer the second interrupt request signal to the MCU 210 through the MOSI signal line. Accordingly, the MCU 210 can check an operation state of the ROIC 220, based on the second interrupt request signal.

Due to the penetration of external noise, when the number of pulses of the touch driving signal differs from a predetermined reference number or the number of pulses of the clock signal SCLK differs from a predetermined reference value, the ROIC 220 can recognize that an operation state thereof is abnormal. A toggle type of the second interrupt request signal of when the ROIC 220 is in a normal operation state can differ from that of the second interrupt request signal of when the ROIC 220 is in an abnormal operation state. Further, in the abnormal operation state, the ROIC 220 can differently generate a toggle type of the second interrupt request signal, based on the kind of error state.

The IRQ mode can operate in hardware and can be shorter in access time than the normal mode, and thus, the transfer efficiency of the first and second interrupt request signal can be enhanced.

In the IRQ mode according to the present embodiment, the ROIC 220 can generate the second interrupt request signal representing whether an operation state thereof is normal by toggling a MOSI signal at every one touch frame or predetermined certain time and can thus notify the MCU 210 whether an operation state thereof is normal. To this end, in the IRQ mode according to the present embodiment, a driving authority of the MOSI signal can be changed from the MCU 210 to the ROIC 220 or from the ROIC 220 to the MCU 210. For example, the selection signal may comprise a low logic period where the clock signal is toggled and a high logic period where the clock signal is not toggled. Changing of the driving authority of the MOSI signal can be performed in the high logic (H) period of a selection signal SSN. For example, in the high logic (H) period, the driving authority of the MOSI signal line is changed from the MCU 210 to the ROIC 220, or is changed from the ROIC 220 to the MCU 210.

In the present embodiment, in order to generate and transfer a second interrupt signal, a separate IRQ pin may not be needed, and it may not be needed to change an operation mode from the IRQ mode to the normal mode. Accordingly, the present embodiment can prevent the consumption of resources and a processing time caused by the additional setting of a pin or the additional changing of a mode. In the present embodiment, ROIC operation state information (i.e., the second interrupt signal) can be transferred from the ROIC 220 to the MCU 210, and when an abnormal operation state occurs, the ROIC 220 can be quickly recovered to a normal state, based on control by the MCU 210.

Figure 3:
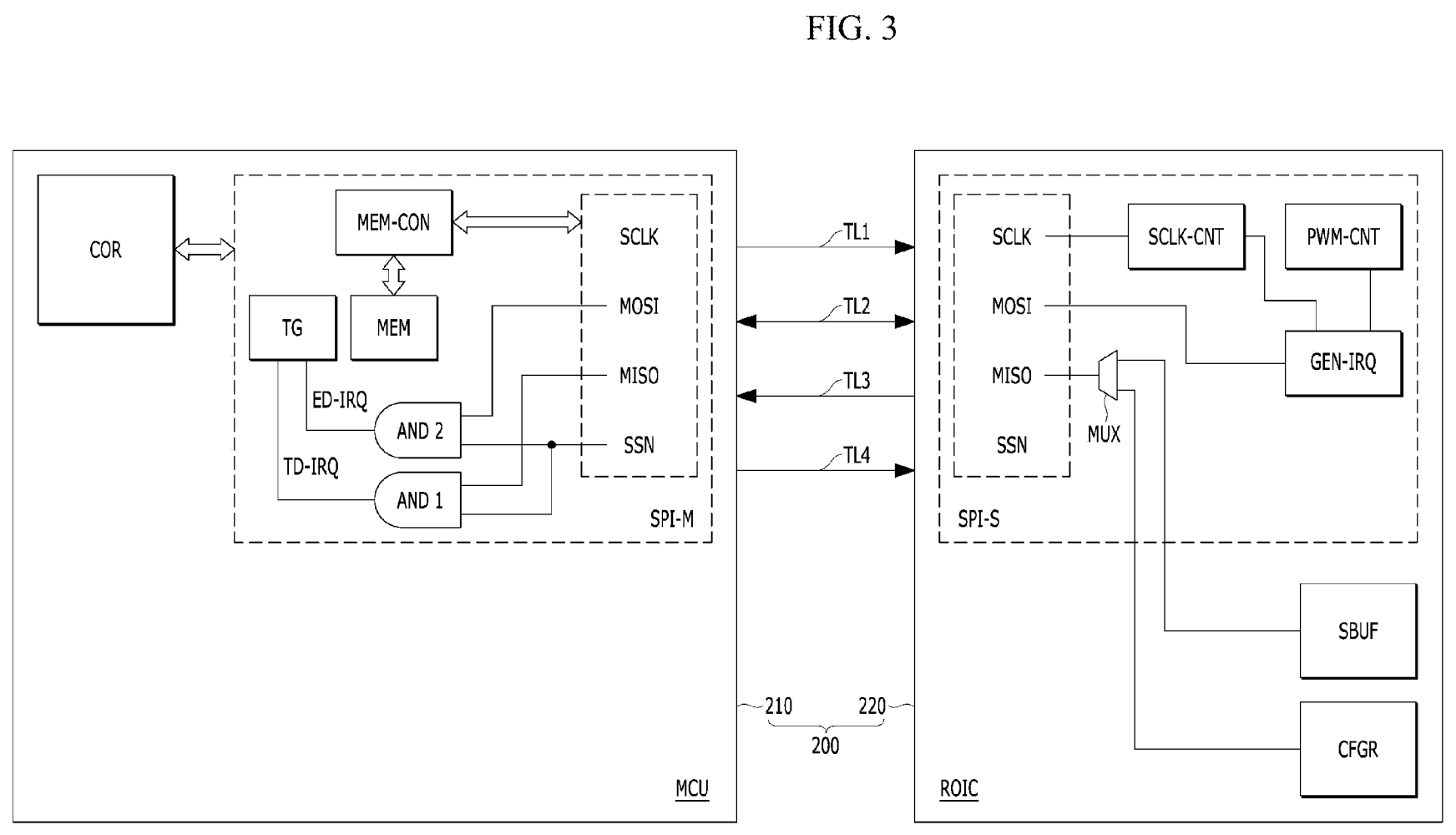

FIG. 3 is a diagram illustrating a hardware configuration of a touch circuit 200 according to one or more embodiments of the present disclosure.

Referring to FIG. 3, the touch circuit 200 according to the present embodiment can include an MCU 210 and an ROIC 220, which are connected to each other through SPI transfer lanes TL1 to TL4, without being limited thereto.

The MCU 210 can include a first interface circuit unit SPI-M and a core unit COR which are connected to each other. For example, the core unit COR may be connected to the first interface circuit unit SPI-M through an internal communication bus, without being limited thereto.

The first interface circuit unit SPI-M may include a plurality of pins which are connected to a plurality of lanes. For example, the first interface circuit unit SPI-M can include an SCLK pin which is connected to a first transfer lane TL1, a MOSI pin which is connected to a second transfer lane TL2, an MISO pin which is connected to a third transfer lane TL3, an SSN pin which is connected to a fourth transfer lane TL4, a first calculator AND1 which performs an AND operation on an input of the MISO pin and an input of the SSN pin to output a first interrupt request signal TD-IRQ in a high logic period of the SSN signal, a second calculator AND2 which performs an AND operation on an input of the MOSI pin and the input of the SSN pin to output a second interrupt request signal ED-IRQ in the high logic period of the SSN signal, a signal converter TG which converts the second interrupt request signal ED-IRQ into core logic information recognizable by the core unit COR, a memory MEM, and a memory controller MEM-CON.

The core unit COR can be connected to the first interface circuit unit SPI-M through the internal communication bus. The core unit COR can control a readout start timing of touch data, based on the core logic information from the signal converter TG of the first interface circuit unit SPI-M, and can check an operation state of the ROIC 220 to control whether to reset the ROIC 220.

The ROIC 220 can include a second interface circuit unit SPI-S, a buffer SBUF, and a register CFGR. Specifically, the buffer SBUF and the register CFGR may be connected to the second interface circuit unit SPI-S.

The second interface circuit unit SPI-S may include a plurality of pins which are connected to a plurality of lanes. For example, the second interface circuit unit SPI-S can include an SCLK pin which is connected to the first transfer lane TL1, a MOSI pin which is connected to the second transfer lane TL2, an MISO pin which is connected to the third transfer lane TL3, an SSN pin which is connected to the fourth transfer lane TL4, a multiplexer MUX which is connected to an output of the MISO pin, an IRQ generator GEN-IRQ which is connected to an output of the MOSI pin, an SCLK counter SCLK-CNT which counts an SCLK, and a PWM counter PWM-CNT which counts the touch driving signal.

The IRQ generator GEN-IRQ can generate the second interrupt request signal ED-IRQ, based on an output the SCLK counter SCLK-CNT and an output of the PWM counter PWM-CNT, and then, can apply the second interrupt request signal ED-IRQ to the output of the MOSI pin. When the number of pulses of the touch driving signal differs from the predetermined reference number or the clock signal SCLK differs from the predetermined reference value, the IRQ generator GEN-IRQ can recognize that an operation state of the ROIC 220 is abnormal and change a toggle type of the second interrupt request signal ED-IRQ to represent that an operation state of the ROIC 220 is abnormal.

The buffer SBUF and the register CFGR can be selectively connected to the output of the MISO pin through the multiplexer MUX.

The first, third, and fourth transfer lanes TL1, TL3, and TL4 can be driven based on unidirectional interfacing, and the second transfer lane TL2 connected to the MOSI pin can be driven based on bidirectional (or two-direction) interfacing, without being limited thereto. Specifically, the first and fourth transfer lanes TL1 and TL4 may be driven based on unidirectional interfacing from the MCU 210 to the ROIC 220, and the third transfer lane TL3 may be driven based on unidirectional interfacing from the ROIC 220 to the MCU 210.

For example, the MCU 210 can exclusively have a driving authority of the SCLK pin connected to the first transfer lane TL1 and a driving authority of the SSN pin connected to the fourth transfer lane TL4. The ROIC 220 can have a driving authority of the MISO pin connected to the third transfer lane TL3. On the other hand, the MCU 210 and the ROIC 220 can alternately and exclusively have a driving authority of the MOSI pin connected to the second transfer lane TL2. However, embodiments are not limited thereto. Changing of a driving authority of the MOSI pin can be performed in a high logic period of the SSN signal.

Figure 4:
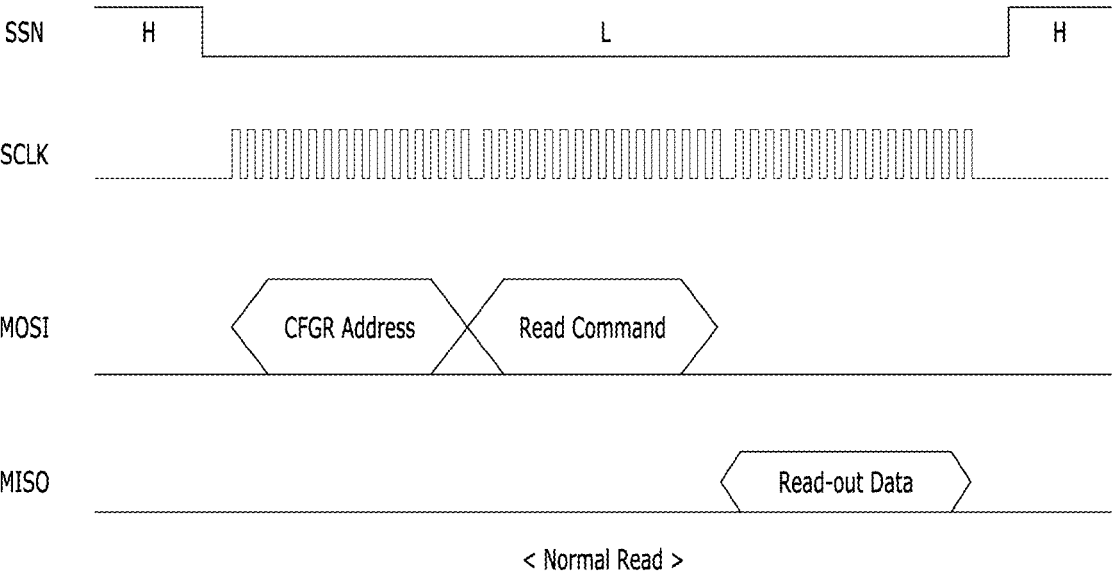
FIGS. 4 and 5 are diagrams illustrating a normal operation mode of a touch circuit according to one or more embodiments of the present disclosure.
Figure 5:
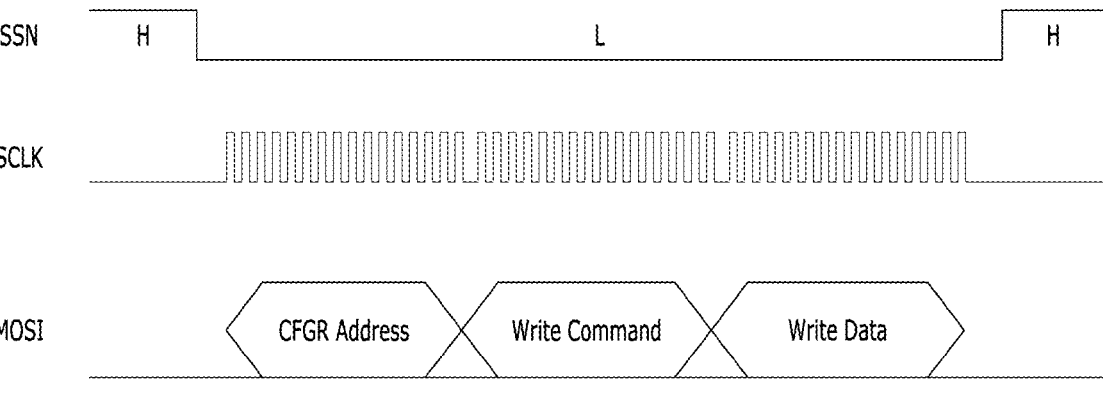

FIGS. 4 and 5 are diagrams illustrating a normal operation mode of a touch circuit 200 according to one or more embodiments of the present disclosure. Specifically, FIG. 4 is a diagram illustrating a normal read operation of a touch circuit 200 according to the present exemplary embodiment, and FIG. 5 is a diagram illustrating a normal write operation of a touch circuit 200 according to the present exemplary embodiment.

Referring to FIG. 4, in the touch circuit 200 according to the present embodiment, in order to perform a normal read operation, the MCU 210 can have a driving authority of the MOSI pin, and the ROIC 220 can have a driving authority of the MISO pin, without being limited thereto.

Referring to FIG. 5, in the touch circuit 200 according to the present embodiment, in order to perform a normal write operation, the MCU 210 can have a driving authority of the MOSI pin, and the ROIC 220 can have a driving authority of the MISO pin, without being limited thereto.

Referring to FIGS. 4 and 5, in the normal operation mode, command data can be read and/or written on a buffer SBUF and a register CFGR of a specific address.

Figure 6:
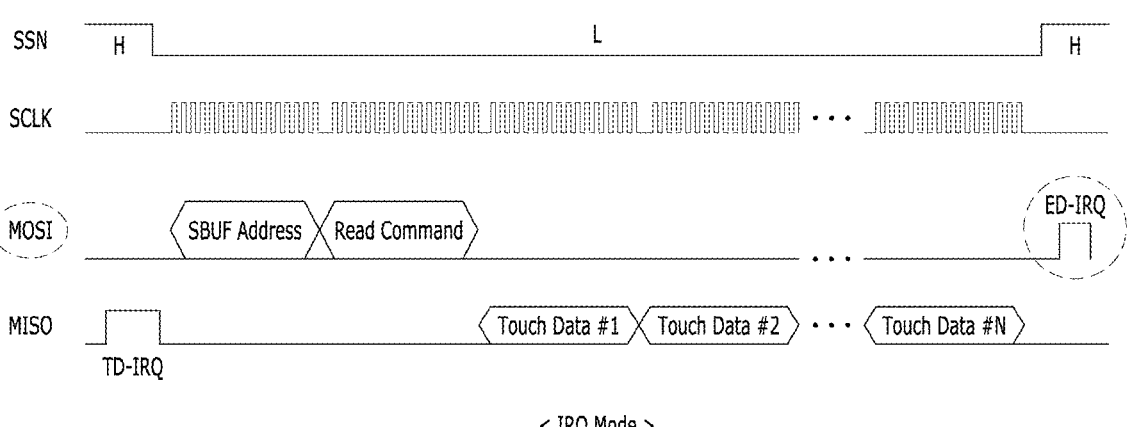
FIG. 6 is a diagram illustrating an interrupt request (IRQ) operation mode of a touch circuit according to one or more embodiments of the present disclosure.

FIG. 6 is a diagram illustrating an IRQ operation mode of a touch circuit according to one or more embodiments of the present disclosure.

Referring to FIG. 6, in the IRQ operation mode, the ROIC 220 may generate a first interrupt request signal TD-IRQ representing an end of touch sensing, the MCU 210 can receive a first interrupt request signal TD-IRQ, representing an end of touch sensing, from the ROIC 220 through a MISO signal line, and then, can read touch data from the ROIC 220 through the MISO signal line.

In the IRQ operation mode, the ROIC 220 may generate a second interrupt request signal ED-IRQ representing an ROIC operation state, the MCU 210 can receive a second interrupt request signal ED-IRQ from the ROIC 220 through a MISO signal line and can thus check an ROIC operation state.

Figure 7:
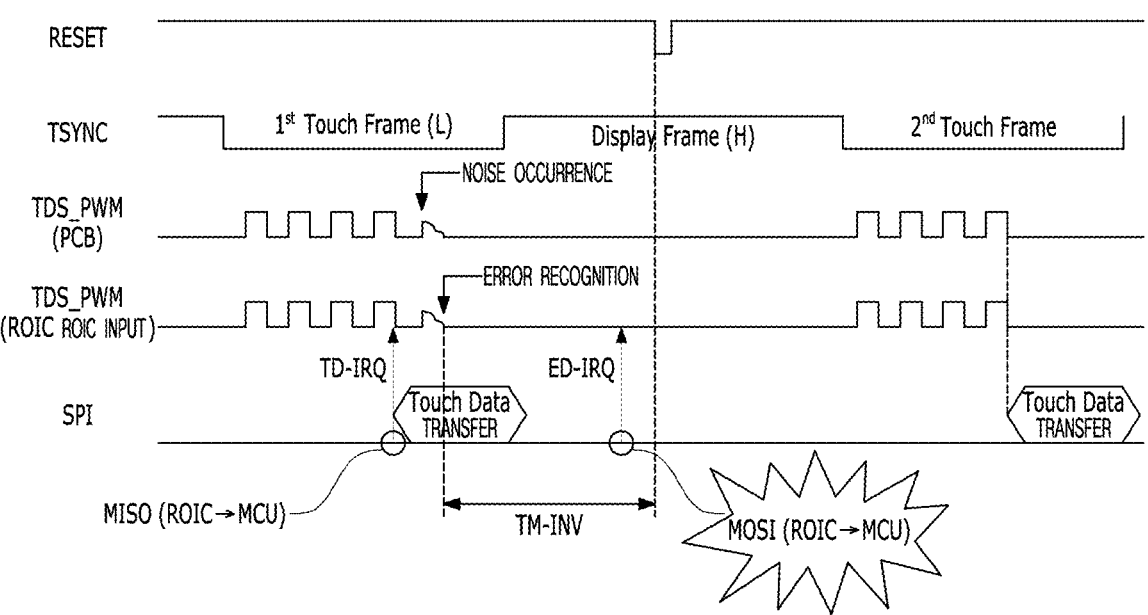
FIG. 7 is a diagram illustrating a concept which toggles a master output slave input (MOSI) signal to generate an interrupt request signal, so as to transfer readout integrated circuit (ROIC) operation state information from an ROIC to a micro control unit (MCU) in a touch circuit according to one or more embodiments of the present disclosure.

FIG. 7 is a diagram illustrating a concept which toggles a MOSI signal to generate an interrupt request signal, so as to transfer ROIC operation state information from an ROIC to an MCU in a touch circuit according to one or more embodiments of the present disclosure. In FIG. 7, "TSYNC" can be a touch/display control signal for temporally dividing a touch frame and a display frame. A low logic period L of "TSYNC" can be a touch frame period, and a high logic period H of "TSYNC" can be a display frame period, without being limited thereto.

A touch driving signal TDS-PWM can be generated by a power management IC mounted on a PCB and can be input to the ROIC 220. However, due to external noise, the touch driving signal TDS-PWM can be input to the ROIC 220 in a state where a partial pulse period of the touch driving signal TDS-PWM is distorted. In this case, the PWM counter PWM-CNT included in the ROIC 220 can supply the IRQ generator GEN-IRQ with a result where the number of pulses of the touch driving signal differs from the predetermined reference number, and thus, the IRQ generator GEN-IRQ can generate a second interrupt request signal ED-IRQ representing that the ROIC 220 is an abnormal operation state, and transfer the second interrupt request signal ED-IRQ to the MCU 210 through the MOSI signal line.

The MCU 210 can assign a driving authority of a MOSI pin to the ROIC 220, and then, the second interrupt request signal ED-IRQ can be transferred to the MCU 210 through a MOSI signal line.

The MCU 210 can previously set the register CFGR of the ROIC 220 to allow the ROIC 220 to have a driving authority of the MOSI pin in a high logic period of an SSN signal after a touch sensing operation, and thus, can receive the second interrupt request signal ED-IRQ, representing that the ROIC 220 is in a normal operation state or an abnormal operation state, from the ROIC 220 through the MOSI signal line.

Therefore, the MCU 210 can check an operation state of the ROIC 220 in the IRQ operation mode without changing to the normal operation mode. Further, the MCU 210 can check an abnormal operation state of the ROIC and can then activate a reset pin for controlling a reset of the ROIC 220 for a short time to perform an ROIC reset operation, thereby considerably decreasing a time TM-INV consumed up to a reset time from an error recognition time. For example, the MCU 210 can check an abnormal operation state of the ROIC 220, and then, can quickly process a reset operation for recovering to a normal state. Specifically, the MCU 210 may transfer the reset signal to the ROIC 220 through the MOSI signal line. Then, the ROIC 220 may perform a reset operation.

At least one of the number of pulses and a pulse width of the second interrupt request signal ED-IRQ can be differently implemented based on the kind of abnormal operation or whether an ROIC operation is normal, without being limited thereto. Specifically, at least one of the number of pulses and a pulse width of the second interrupt request signal generated by the readout integrated circuit in the normal operation state differs from at least one of the number of pulses and a pulse width of the second interrupt request signal generated by the readout integrated circuit in the abnormal operation state. The MCU 210 can determine the kind of abnormal operation or whether the ROIC operation is normal, based on at least one of the number of pulses and the pulse width of the second interrupt request signal ED-IRQ and can perform a suitable operation subsequent thereto.

Figure 8:
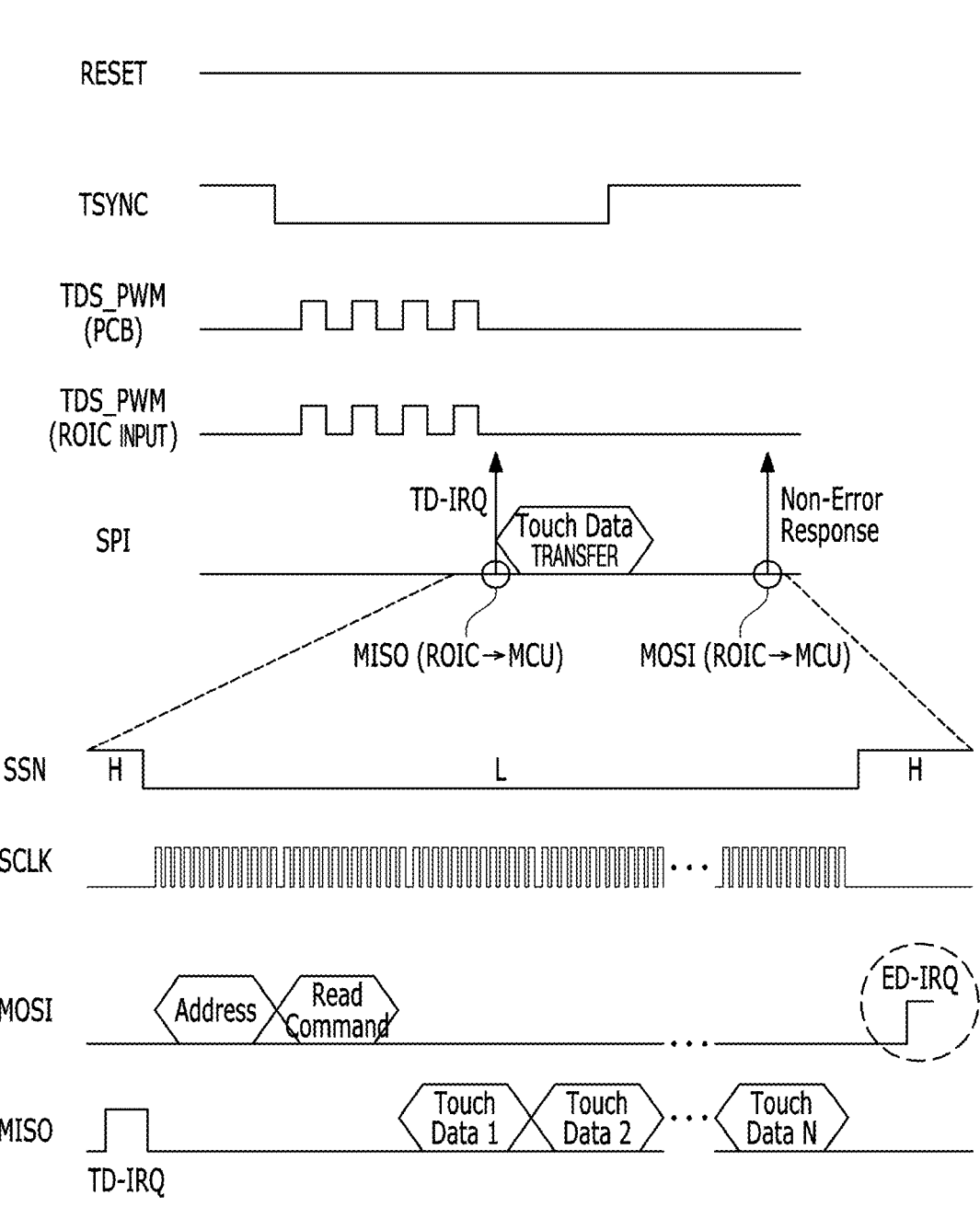
FIG. 8 is a diagram illustrating operations of an ROIC and an MCU when the ROIC is in a non-error state, in a touch circuit according to one or more embodiments of the present disclosure.

FIG. 8 is a diagram illustrating operations of an ROIC and an MCU when the ROIC is in a non-error state, in a touch circuit according to one or more embodiments of the present disclosure.

As one example, during a high logic period H of a selection signal SSN where a clock signal SCLK is not toggled, the ROIC 220 may transfer the second interrupt request signal to the MCU 210 through the MOSI signal line.

Referring to FIG. 8, when an ROIC operation is normal, the ROIC 220 can generate a second interrupt request signal ED-IRQ of a first pulse type, and then, can transfer the second interrupt request signal ED-IRQ of the first pulse type to the MCU 210 through a MOSI signal line in a high logic period H of a selection signal SSN where a clock signal SCLK is not toggled.

Figure 9:
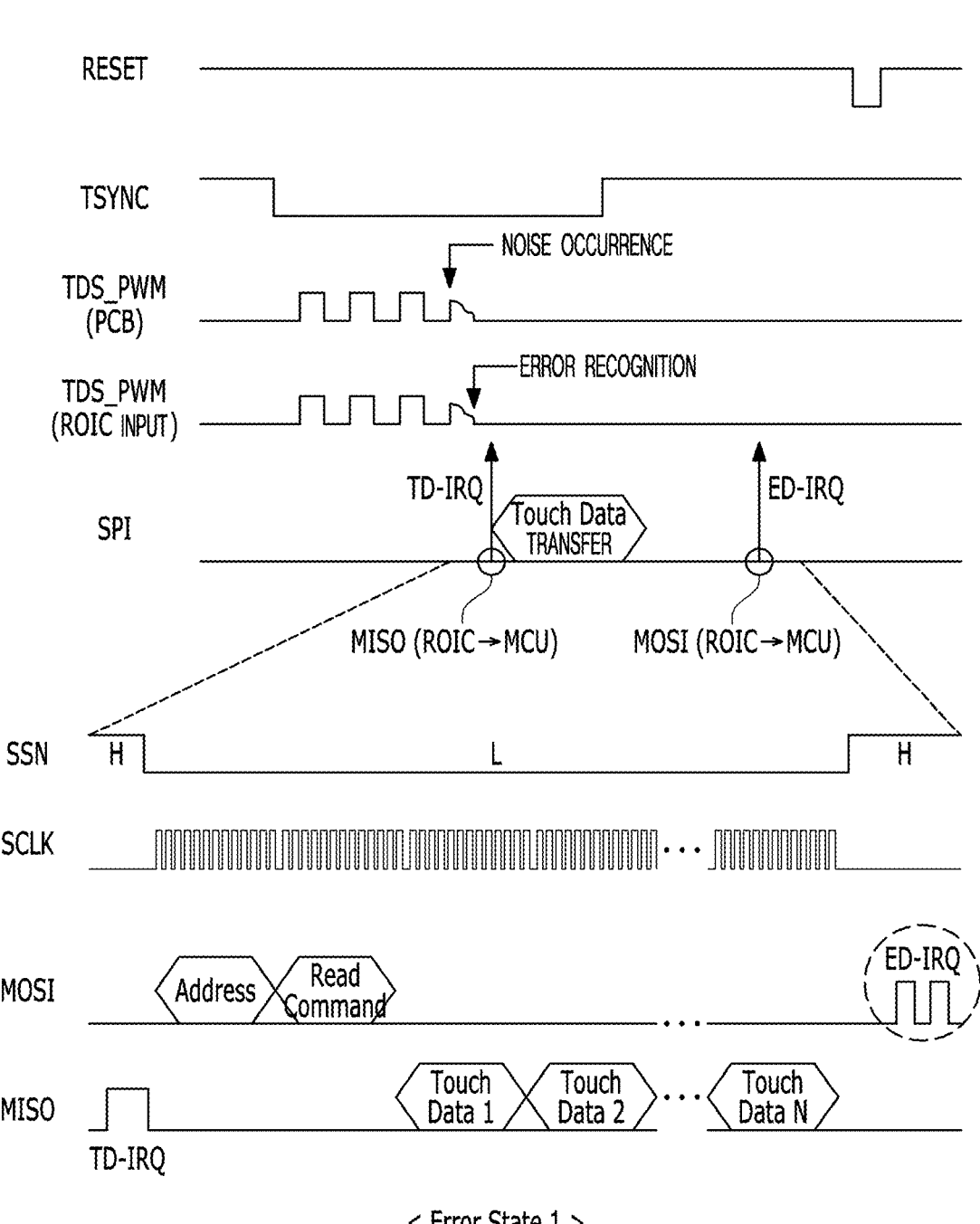
FIG. 9 is a diagram illustrating operations of an ROIC and an MCU when the ROIC is in a first error state, in a touch circuit according to one or more embodiments of the present disclosure.

FIG. 9 is a diagram illustrating operations of an ROIC and an MCU when the ROIC is in a first error state, in a touch circuit according to one or more embodiments of the present disclosure. The first error state can be a case where the number of pulses of a touch driving signal TDS-PWM is counted to be different from a predetermined reference number due to noise.

As one example, during a high logic period H of a selection signal SSN where a clock signal SCLK is not toggled, the ROIC 220 may transfer the second interrupt request signal to the MCU 210 through the MOSI signal line.

Referring to FIG. 9, when an ROIC operation is in the first error state, the ROIC 220 can generate a second interrupt request signal ED-IRQ of a second pulse type, and then, can transfer the second interrupt request signal ED-IRQ of the second pulse type to the MCU 210 through a MOSI signal line in a high logic period H of a selection signal SSN where a clock signal SCLK is not toggled.

Subsequently, the ROIC may be reset based on control by the MCU 210.

Figure 10:
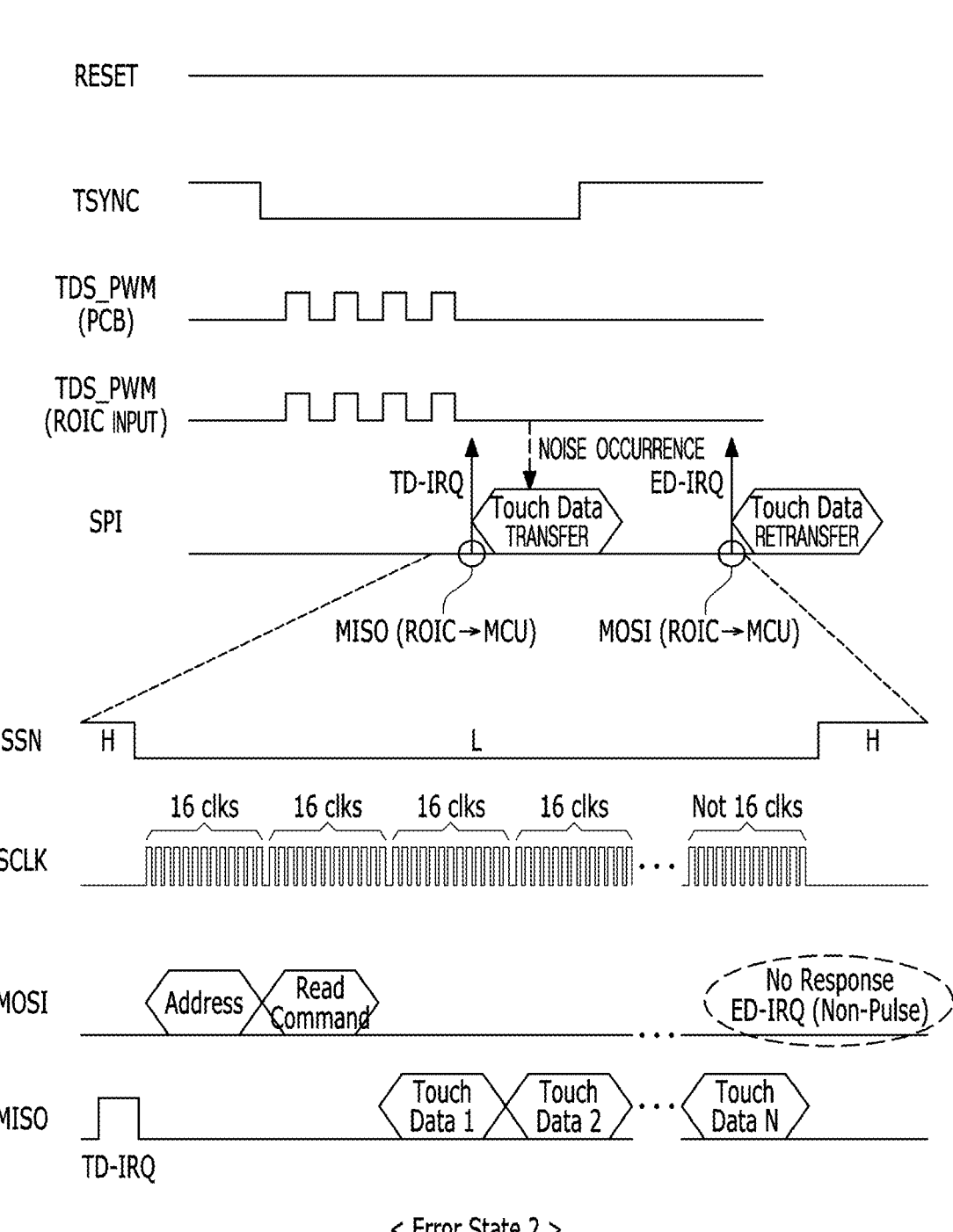
FIG. 10 is a diagram illustrating operations of an ROIC and an MCU when the ROIC is in a second error state, in a touch circuit according to one or more embodiments of the present disclosure.

FIG. 10 is a diagram illustrating operations of an ROIC and an MCU when the ROIC is in a second error state, in a touch circuit according to one or more embodiments of the present disclosure. The second error state can be a case where a clock signal SCLK is counted to be different from a predetermined reference value due to noise.

As one example, during a high logic period H of a selection signal SSN where a clock signal SCLK is not toggled, the ROIC 220 may transfer the second interrupt request signal to the MCU 210 through the MOSI signal line.

Referring to FIG. 10, when an ROIC operation is in the second error state, the ROIC 220 can generate a second interrupt request signal ED-IRQ of a non-pulse type, and then, can transfer the second interrupt request signal ED-IRQ of the non-pulse type to the MCU 210 through a MOSI signal line in a high logic period H of a selection signal SSN where the clock signal SCLK is not toggled.

When the ROIC operation is in the second error state, the ROIC 220 may not be reset, and touch data can be retransferred from the ROIC 220 to the MCU 210.

Figure 11:
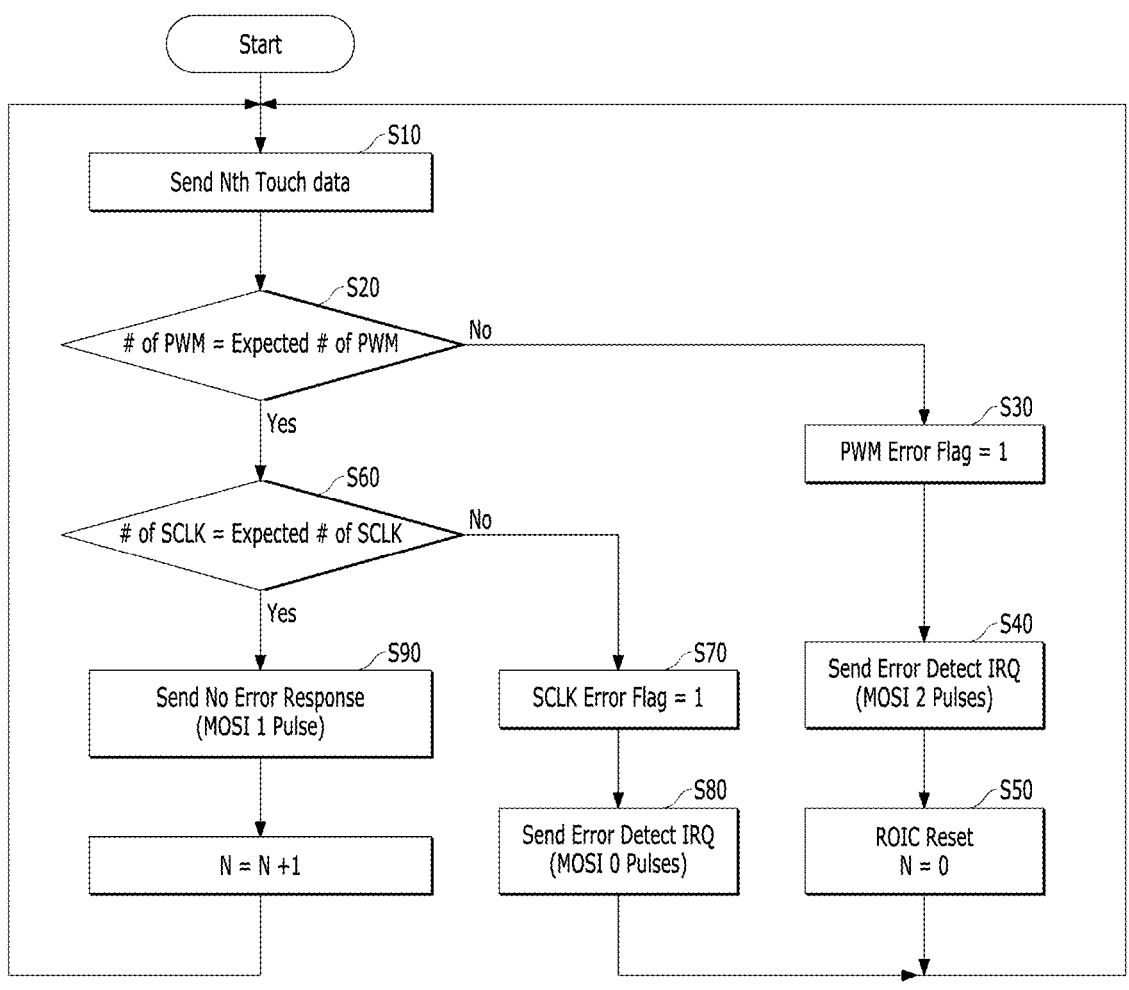
FIG. 11 is a diagram illustrating a driving method where the number of toggles of a MOSI signal transferred from an ROIC to an MCU is changed based on an ROIC operation state, in a touch circuit according to one or more embodiments of the present disclosure.

FIG. 11 is a diagram illustrating a driving method where the number of toggles of a MOSI signal transferred from an ROIC to an MCU is changed based on an ROIC operation state, in a touch circuit according to one or more embodiments of the present disclosure.

Referring to FIG. 11, the ROIC can transfer $N^{th}$ touch data to the MCU (S10).

Subsequently, the ROIC can compare the number of pulses of a touch driving signal TDS-PWM with a predetermined reference number, and when the number of pulses of the touch driving signal TDS-PWM differs from the predetermined reference number, the ROIC can generate a PWM error flag "1" (S20 and S30). In other words, when the number of pulses of the touch driving signal TDS_PWM differs from the predetermined reference number, the ROIC may recognize that an operation state thereof is abnormal.

Subsequently, the ROIC can generate a second interrupt request signal ED-IRQ of a second pulse type, and then, can transfer the second interrupt request signal ED-IRQ of the second pulse type to the MCU through a MOSI signal line in a high logic period of a selection signal where a clock signal SCLK is not toggled (S40). To transfer the second interrupt request signal ED-IRQ, the ROIC may have a driving authority of an MOSI signal.

Subsequently, the ROIC can be reset based on control by the MCU (S50).

Furthermore, the ROIC can compare the number of pulses of the touch driving signal TDS-PWM with the predetermined reference number, and when the number of pulses of the touch driving signal TDS-PWM is equal to the predetermined reference number, the ROIC can compare the number of pulses of the clock signal SCLK with a predetermined reference value (S60).

When the number of pulses of the clock signal SCLK differs from the predetermined reference value, the ROIC can generate an SCLK error flag "1" (S70). In other words, when the number of pulses of the clock signal SCLK differs from the predetermined reference value, the ROIC may recognize that an operation state thereof is abnormal.

Subsequently, the ROIC can generate a second interrupt request signal ED-IRQ of a zero-pulse type, and then, can transfer the second interrupt request signal ED-IRQ of the zero-pulse type to the MCU through the MOSI signal line in the high logic period of the selection signal where the clock signal SCLK is not toggled (S80).

Furthermore, when the number of pulses of the clock signal SCLK is equal to the predetermined reference number, the ROIC can generate a second interrupt request signal ED-IRQ of a one-pulse type, and then, can transfer the second interrupt request signal ED-IRQ of the one-pulse type to the MCU through the MOSI signal line in the high logic period of the selection signal where the clock signal SCLK is not toggled (S90).

Figure 12:
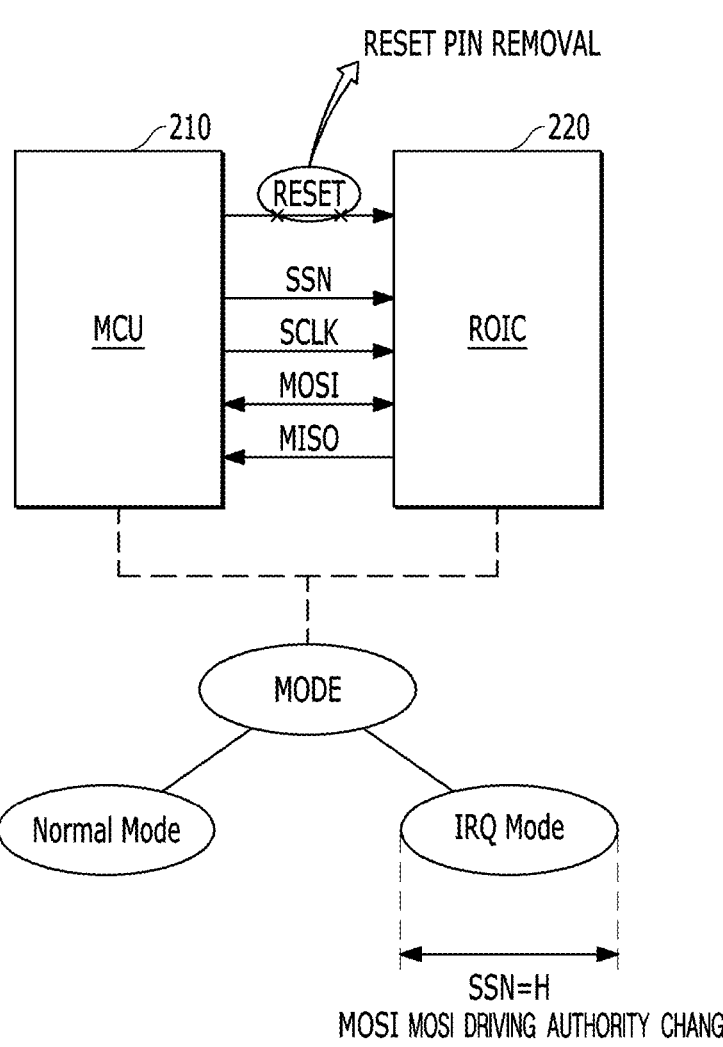
FIG. 12 is a diagram illustrating a modification embodiment of a touch circuit according to one or more embodiments of the present disclosure.
Figure 13:
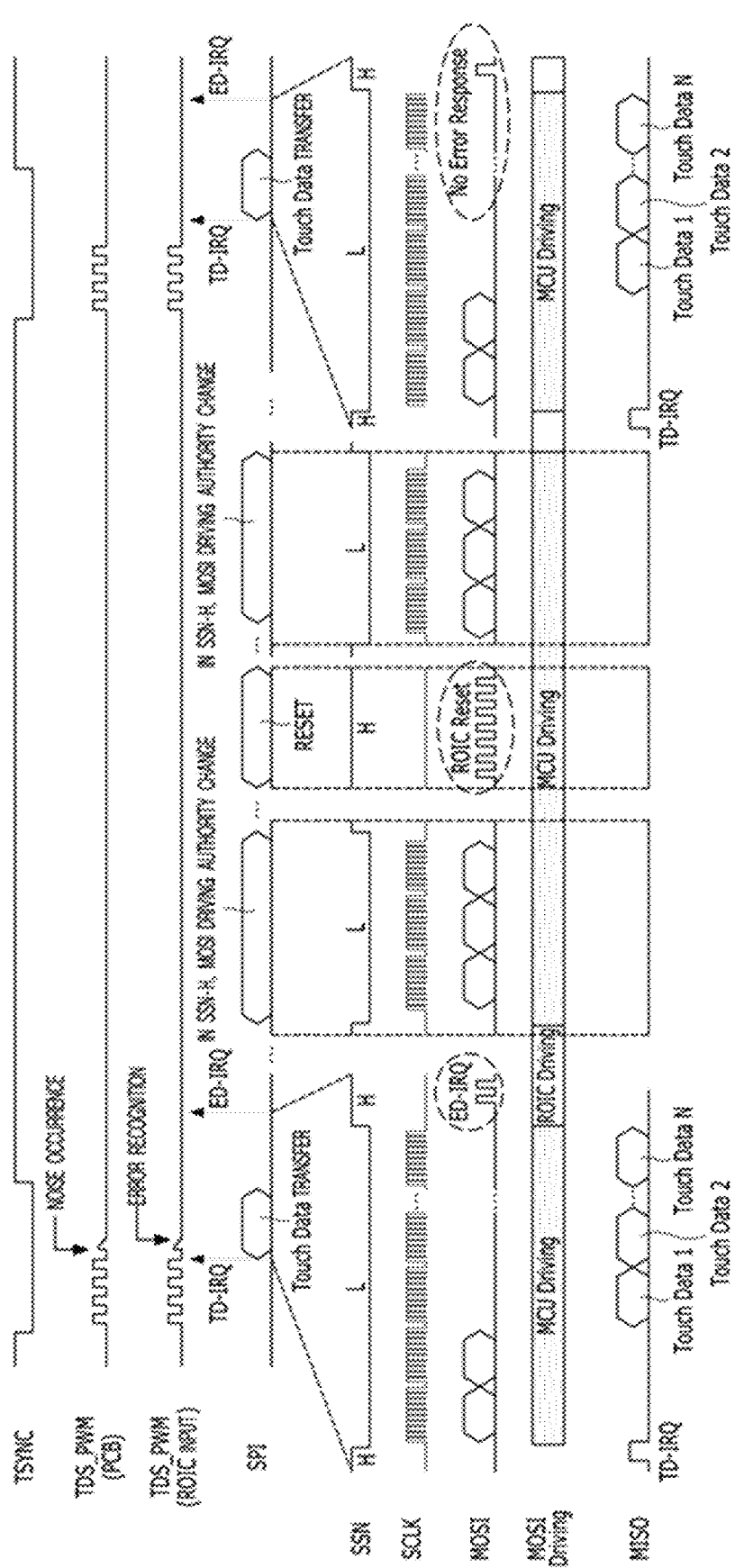
FIG. 13 is a diagram illustrating a concept which toggles a MOSI signal to generate an interrupt request signal, so as to transfer ROIC operation state information from an ROIC to an MCU and transfer reset information from the MCU to the ROIC in a touch circuit according to one or more embodiments of the present disclosure.

FIG. 12 is a diagram illustrating a modification embodiment of a touch circuit according to one or more embodiments of the present disclosure. FIG. 13 is a diagram illustrating a concept which toggles a MOSI signal to generate an interrupt request signal, so as to transfer ROIC operation state information from an ROIC to an MCU and transfer reset information from the MCU to the ROIC in a touch circuit according to one or more embodiments of the present disclosure.

Referring to FIG. 12, the touch circuit according to the present exemplary embodiment may include an MCU 210 and an ROIC 220 which are connected to each other, without being limited thereto. To this end, each of the MCU 210 and the ROIC 220 may include a plurality of connection pins which are connected to each other through a plurality of transfer lines.

For example, the plurality of transfer lines may comprise a selection signal (SSN) line, a clock signal (SCLK) line, a master output slave input (MOSI) signal line, and a master input slave output (MISO) signal line, without being limited thereto.

Referring to FIG. 12, each of an MCU 210 and an ROIC 220 according to the present embodiment can include a plurality of connection pins connected to a selection signal (SSN) line, a clock signal (SCLK) line, a master output slave input (MOSI) signal line, and a master input slave output (MISO) signal line, which are used for SPI communication.

In the embodiment of the FIG. 12, unlike FIG. 2, a reset pin for controlling a reset of the ROIC 220 and a reset line can be omitted in the MCU 210 and the ROIC 220.

In the embodiment of the FIG. 12, because there is no separate reset line, the MCU 210 can transfer a reset signal to the ROIC 220 through a MOSI signal line as in FIG. 13.

Referring to FIG. 13, the reset signal transferred from the MCU 210 to the ROIC 220 through the MOSI signal line can represent a predetermined reset code (for example, 1010101010101) which is expressed as a binary number by repeating three or more pulses. The ROIC 220 can analyze the reset code, and when the reset code matches a predetermined value, the ROIC 220 can determine a reset command and can perform a reset operation for recovering to a normal state. In other words, the MCU 210 may transfer the reset signal to the ROIC 220 through the MOSI signal line. Then, the ROIC 220 may perform a reset operation. The reset code can be converted into various types. To this end, the number of pulses and a pulse with of the reset signal can be variously modified.

The reset signal can be distorted due to noise of the MOSI signal line, and thus, a code of the same type can be repeatedly transferred as the reset signal a plurality of times.

When a high state is changed to a low state or a low state is changed to a high state in a certain period of the reset signal due to noise even in a case where the reset signal is transferred through the MOSI signal line, it can be difficult for the ROIC 220 to determine an accurate reset signal. To solve such a problem, the MCU 210 can transfer, to the ROIC 220, a reset signal where a predetermined reset code is repeated five times. Therefore, when the ROIC 220 recognizes the reset code of the reset signal three or more times, the ROIC 220 can determine a normal reset command.

Referring to FIG. 13, when a touch sensing operation is completed, the ROIC 220 can generate a first interrupt request signal TD-IRQ representing completion of touch sensing to transfer to the MCU 210 through the MISO signal line. Then, the MCU 210 may receive the first interrupt request signal to start a touch data read operation. Specifically, the MCU 210 can check the first interrupt request signal TD-IRQ and can read touch data from the ROIC 220 through the MISO signal line.

Subsequently, the ROIC 220 can compare the number of pulses of a touch driving signal TDS-PWM with a predetermined reference number, the ROIC may generate a second interrupt request signal ED-IRQ of a second pulse type, and then, may transfer the second interrupt request signal ED-IRQ of the second pulse type to the MCU through an MOSI signal line in a high logic period of a selection signal where a clock signal SCLK is not toggled.

For example, the ROIC 220 can generate a second interrupt request signal ED-IRQ of a two-pulse type in a high logic period H of a selection signal SSN where a clock signal SCLK is not toggled and can transfer the second interrupt request signal ED-IRQ of the two-pulse type to the MCU 210 through the MOSI signal line. To transfer the second interrupt request signal ED-IRQ, the ROIC 220 can have a driving authority of a MOSI signal.

Subsequently, the driving authority of the MOSI signal can be again assigned to the MCU 210 in the high logic period H of the selection signal SSN. The MCU 210 can transfer the reset signal to the ROIC 220 through the MOSI signal line. Then, the ROIC 220 can perform a reset operation.

Subsequently, the driving authority of the MOSI signal can be again assigned to the ROIC 220 in the high logic period H of the selection signal SSN.

Subsequently, the ROIC 220 can compare the number of pulses of the touch driving signal TDS-PWM with the predetermined reference number, and when the number of pulses of the touch driving signal TDS-PWM is equal to the predetermined reference number, the ROIC 220 can generate a second interrupt request signal ED-IRQ of a one-pulse type in the high logic period H of the selection signal SSN where the clock signal SCLK is not toggled and can generate the second interrupt request signal ED-IRQ of the one-pulse type to transfer to the MCU 210 through the MOSI signal line.

One or more aspects of the present disclosure can realize the following effects and advantages.

One or more aspects of the present disclosure can transfer ROIC operation state information from an ROIC to an MCU without a change in operation mode in the middle of touch sensing and can quickly recover an abnormal operation state to a normal state when an abnormal operation occurs.

The effects according to one or more aspect of the present disclosure are not limited to the above examples, and other various effects can be included in the disclosure.

While the present disclosure has been particularly shown and described with reference to example embodiments thereof, it will be understood by those of ordinary skill in the art that various changes in form and details can be made therein without departing from the spirit and scope of the present disclosure as defined by the following claims.

What is claimed is:

1. A touch circuit comprising:
a micro control circuit; and
a readout integrated circuit configured to communicate with the micro control circuit though a selection signal line, a clock signal line, a master output slave input (MOSI) signal line, and a master input slave output (MISO) signal line,
wherein, in a first period, the readout integrated circuit generates a first interrupt request signal representing completion of touch sensing, and transfers the first interrupt request signal to the micro control circuit through the MISO signal line, and
in a second period which differs from the first period, the readout integrated circuit generates a second interrupt request signal representing a kind of error and whether an operation state thereof is normal, and transfers the second interrupt request signal to the micro control circuit through the MOSI signal line.

2. The touch circuit of claim 1, wherein when the number of pulses of a touch driving signal differs from a predetermined reference number, the readout integrated circuit generates the second interrupt request signal representing an abnormal operation state.

3. The touch circuit of claim 1, wherein the MOSI signal line is driven based on bidirectional interfacing, and
the micro control circuit and the readout integrated circuit alternately and exclusively have a driving authority of the MOSI signal line.

4. The touch circuit of claim 1, wherein the selection signal line, the clock signal line and the MISO signal line are driven based on unidirectional interfacing, and
the micro control circuit exclusively has a driving authority of the selection signal line and the clock signal line, the readout integrated circuit exclusively has a driving authority of the MISO signal line.

5. The touch circuit of claim 3, wherein a selection signal from the selection signal line comprises a low logic period where a clock signal from the clock signal line is toggled, and a high logic period where the clock signal is not toggled, and
in the high logic period of the selection signal, the driving authority of the MOSI signal line is changed from the micro control circuit to the readout integrated circuit, or is changed from the readout integrated circuit to the micro control circuit.

6. The touch circuit of claim 1, wherein a selection signal from the selection signal comprises a low logic period where a clock signal from the clock signal line is toggled, and a high logic period where the clock signal is not toggled, and
in the high logic period of the selection signal, the readout integrated circuit transfers the second interrupt request signal to the micro control circuit through the MOSI signal line.

7. The touch circuit of claim 1, wherein a toggle type of the second interrupt request signal generated by the readout integrated circuit in a normal operation state differs from a toggle type of the second interrupt request signal generated by the readout integrated circuit in an abnormal operation state.

8. The touch circuit of claim 7, wherein at least one of a number of pulses and a pulse width of the second interrupt request signal generated by the readout integrated circuit in the normal operation state differs from at least one of a number of pulses and a pulse width of the second interrupt request signal generated by the readout integrated circuit in the abnormal operation state.

9. The touch circuit of claim 1, wherein, in an abnormal operation state, the readout integrated circuit differently generates a toggle type of the second interrupt request signal, based on a predetermined kind of error.

10. The touch circuit of claim 9, wherein, in the abnormal operation state, the readout integrated circuit differently generates at least one of a number of pulses and a pulse width of the second interrupt request signal, based on the predetermined kind of error.

11. The touch circuit of claim 1, wherein, in a third period which differs from the first and second periods, the micro control circuit transfers reset information, which is for resetting the readout integrated circuit, to the readout integrated circuit through the MOSI signal line.

12. The touch circuit of claim 1, further comprising a reset line through which the micro control circuit transfers reset information which is for resetting the readout integrated circuit, to the readout integrated circuit.

13. The touch circuit of claim 11, wherein the reset information represents a predetermined reset code which is expressed as a binary number by repeating three or more pulses.

14. A touch sensing display device comprising:
a display panel; and
the touch circuit of claim 1 and configured to sense a touch input applied to the display panel.

* * * * *